(12) United States Patent
Watkinson

(10) Patent No.: US 7,946,136 B2
(45) Date of Patent: May 24, 2011

(54) METHOD AND APPARATUS FOR FORMING GLASS FLAKES AND FIBRES

(75) Inventor: Charles Watkinson, Yorkshire (GB)

(73) Assignee: Glass-Flake Limited, Leeds (GB)

( * ) Notice: Subject to any disclaimer, the term of this patent is extended or adjusted under 35 U.S.C. 154(b) by 0 days.

(21) Appl. No.: 12/706,795

(22) Filed: Feb. 17, 2010

(65) Prior Publication Data

US 2010/0139325 A1 Jun. 10, 2010

Related U.S. Application Data

(63) Continuation of application No. 10/539,125, filed as application No. PCT/GB02/05794 on Dec. 19, 2002, now abandoned.

(51) Int. Cl.
C03B 37/01 (2006.01)
C03B 37/07 (2006.01)

(52) U.S. Cl. .............. 65/441; 65/425; 65/488; 219/678; 219/687

(58) Field of Classification Search ............ 65/376–540; 219/678–763
See application file for complete search history.

(56) References Cited

U.S. PATENT DOCUMENTS

| 1,375,336 | A |   | 4/1921 | Wadsworth |
| 4,133,664 | A | * | 1/1979 | Aulich et al. ............ 65/405 |
| 4,145,200 | A | * | 3/1979 | Yamazaki et al. ........... 65/405 |
| 4,344,785 | A |   | 8/1982 | Jensen |
| 4,713,106 | A |   | 12/1987 | McCague |
| 4,812,151 | A |   | 3/1989 | Sheinkop et al. |
| 4,908,492 | A | * | 3/1990 | Okamoto et al. ........ 219/121.52 |
| 5,104,432 | A |   | 4/1992 | Williams et al. |
| 6,125,660 | A |   | 10/2000 | Gorobinskaya et al. |

FOREIGN PATENT DOCUMENTS

EP 0 289 240 B1 4/1992

OTHER PUBLICATIONS

International Preliminary Examination Report for PCT/GB02/05794, 2003.

* cited by examiner

Primary Examiner — Matthew J Daniels
Assistant Examiner — Cynthia Szewczyk
(74) Attorney, Agent, or Firm — Myers Bigel Sibley & Sajovec

(57) ABSTRACT

Apparatus for forming fibers or flakes of material comprises means (1) for producing a heated stream of molten material (9), means for feeding the stream in a substantially vertically downward direction and means (7) for receiving the downwardly directed stream and for forming fibers or flakes therefrom. The apparatus includes means (11, 13, 15, 17) for effecting a change in the temperature of the stream subsequent to the production thereof whereby fibers or flakes of a desired thickness are obtained. Instead of, or in addition to, the temperature changing means, there may be provided means for controlling the mass or volume flow of the stream. The invention also provides methods corresponding to the apparatus.

7 Claims, 1 Drawing Sheet

METHOD AND APPARATUS FOR FORMING GLASS FLAKES AND FIBRES

RELATED APPLICATIONS

This application is a continuation application of application Ser. No. 10/539,125, filed Apr. 27, 2006 and now abandoned, and which claims the benefit of PCT International Application No. PCT/GB2002/005794, having an international filing date of Dec. 19, 2002, the contents of which are hereby incorporated by reference as if recited in full herein.

FIELD OF THE INVENTION

The invention relates to methods and apparatus for forming flakes or fibres of glass or of other similar materials, including ceramic material.

The present invention is applicable to any material which melts when heated and is capable of being formed into flakes and fibres. Such entities are increasingly being used for the reinforcement of plastics or other composite materials.

BACKGROUND TO THE INVENTION

In our European patent specification No 0 289 240 there is disclosed apparatus for forming flakes of material from a heated stream of molten material. The apparatus comprises means for feeding the stream in a downwards direction into a rotating cup, the cup being arranged with its open mouth facing upwardly such that molten material within the cup is caused to flow over the upper edges of the cup and flow outwards in a radial direction due to centrifugal force. The apparatus also includes a pair of spaced apart substantially parallel plates arranged about the cup such that the material leaving the cup by centrifugal force passes through a gap defined between the plates. The plates are mounted within a vacuum chamber arranged such that a vacuum is applied to the space between the plates to draw air from outside the chamber between the plates in a radial direction to prevent the molten material from touching the sides of the plates and to cool material until it reaches a solid state pulling the material in a radial direction thereby keeping the material in the form of a flat film and breaking it into small platelets.

In the production of glass or ceramic fibre or flake the thickness is determined in part by the temperature and volume of the flow stream entering the spinning device producing the product. As the flow stream is necessarily open to atmosphere between an outlet from which the stream emerges and the spinning device, it is subject to heat loss and variation in temperature. The loss of heat is detrimental to the production of thin fibres or flake, particularly in the sub-micron range and changes in temperature as small as one degree cause variation in thickness. The viscosity of the glass mass within a source tank or reservoir is determined by temperature variations which in turn cause changes in mass flow through the outlet from which the stream emerges. Additional mass flow changes are caused by head variations within the tank.

Furthermore, in order to compensate for the heat loss outside the source tank, the temperature within the tank may need to be higher than the stream temperature by some hundreds of degrees. This is not only energy wasteful but may cause severe erosion and corrosion of the refractory lining within the tank.

STATEMENTS OF THE INVENTION

According to the present invention there is provided apparatus for forming fibres or flakes of material comprising means for producing a heated stream of molten material, means for feeding the stream in a substantially vertically downward direction, means for receiving the downwardly directed stream and for forming fibres or flakes therefrom, and means for effecting a change in the temperature of the stream subsequent to the production thereof whereby fibres or flakes of a desired thickness are obtained.

The temperature changing means may be arranged to effect a change of temperature in the stream while it is travelling in a vertically downward direction. Alternatively, the temperature changing means may be arranged to effect a change of temperature in the stream prior to it travelling in a vertically downward direction.

In accordance with the present invention the apparatus includes means for applying a high frequency (RF) current to the vertically downwardly travelling stream.

In another embodiment in accordance with the present invention, means are provided for applying an electric current to the vertically downwardly travelling stream.

In a further embodiment in accordance with the present invention, the apparatus is alternatively or additionally by provided with means for cooling the stream prior to it being fed in a downward direction. The cooling means may include a conduit through which the stream is fed, said conduit being surrounded by a cooling coil or jacket through which an appropriate cooling fluid, such as air, may be fed. The effect of cooling the stream within the conduit is to solidify an outer region of the stream in the vicinity of the outlet from the conduit. In this way, the volume mass flow of the flow stream is reduced.

Although this variation in the volume of the flow stream is produced by varying the temperature of at least the outer region of the flow stream, it should be appreciated that variation of the volume of the flow stream represents, in general, an alternative or additional method of controlling the thickness of the resultant flakes or fibres. Accordingly, considered in another aspect, the present invention also provides apparatus as defined above in which in addition to or in substitution of the temperature changing means there are provided mass flow control means. Such control means are typically positioned to effect the mass flow prior to the stream being fed in a vertically downward direction.

The present invention further provides a method for forming fibres or flakes or material comprising producing a heated stream of molten material, feeding the stream in a substantially vertically downward direction, receiving the downwardly directed stream and forming fibres or flakes therefrom, and effecting a change in the temperature of the stream subsequent to the production thereof whereby fibres or flakes or a desired thickness are obtained.

The present invention also provides a corresponding method in which the mass or volume flow of the stream is controlled, prior to the stream travelling in a vertically downward direction, in order again to produce fibres or flakes of a desired thickness.

BRIEF DESCRIPTION OF THE DRAWING

The accompanying drawing is a schematic section through apparatus in accordance with the present invention.

DETAILED DESCRIPTION OF THE INVENTION

Figure 1:
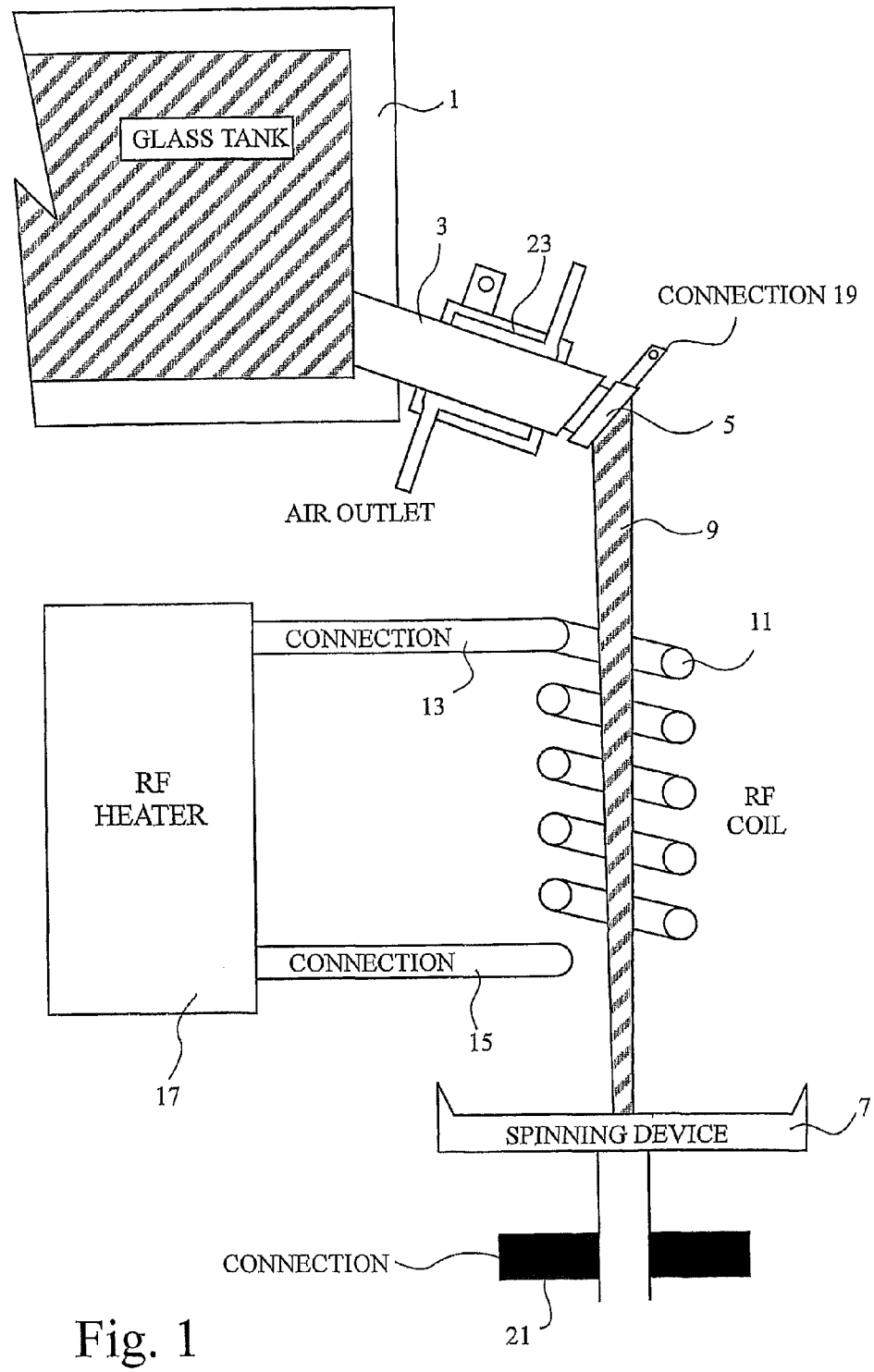

The invention will now be described, by way of example only, with reference to the accompanying drawing.

The apparatus includes a tank 1 for holding molten glass. Extending from tank 1 is an outlet conduit or bushing 3 which terminates in an outlet orifice 5. The stream is found in conduit 3 from material fed from tank 1 and the internal diameter of orifice 5 defines the diameter of a stream of liquid glass at the point where it leaves conduit 3 and descends vertically from the orifice. As indicated in the drawing the stream exiting from orifice 5 descends vertically downwards towards a spinning device 7 which may be substantially as described in EP 0 289 240. Indeed the apparatus includes further components for producing the flake or fibres from the liquid stream 9, these components not being shown in the accompanying drawing. However they may be substantially as shown and described in EP 0 289 240.

The apparatus includes a coil 11 which surrounds the stream 9 around about half its length in a central section of the vertically downward path. This coil is suitable for passing a high frequency (RF) current therethrough. The coil is connected by connections 13 and 15 to an RF heater 17 which generates the desired current level. The passage of the high frequency current through coil 11 causes the excitement of the molecules in the glass stream by microwave transmission. An infrared receptor (not shown) is located at the base of the glass stream and is connected to suitable control circuitry for regulating the coil output and thereby the amount of heat transmitted into the glass stream. A large amount of heat can be instantaneously created within the flow stream thereby allowing close temperature regulation.

Also shown in the drawing are components for another method of directly heating the glass stream. This method involves the passing of an electric current through the stream between an upward connection 19 in the form of an electrode connected to bushing 5. Such a connection can be achieved by using a bushing made of an electrically conductive material so that the bushing is itself the electrode or, alternatively, positioning an electrode either immediately in front of the bushing within the tank or immediately after it and in contact with the flow stream.

At the other end of the flow stream, electrical connection to the spinning device 7 is made by means of a slip ring attached to the shaft of the spinning device and including static brushes 21 through which the electrical connection is made. Control of the current is by way of a transformer (not shown) with suitable voltage and current output. Current variation may be achieved by, for instance, thyristor control and an infrared receptor as described above.

In addition or as an alternative to the above described means for heating the glass stream, the apparatus may be provided with means for controlling the mass flow. These means are provided at the conduit 3 and involve cooling the glass stream emerging from the tank 1. The conduit is provided with an oversized aperture and is externally clad with a cooling jacket 23 through which may be fed cooling fluid. The jacket may be a simple coil wrapped round the bushing and fed with water or it may be an external annular ring through which compressed air is passed. As the molten glass passes through the bushing, the bushing is cooled and a layer of molten material is solidified within the bushing orifice. This has the effect of reducing the aperture size and thereby reducing the mass flow. Although there is a loss of heat from the flow stream, this is relatively small because the melt stream material is a poor thermal conductor when solidified.

The change in temperature is linear with mass flow and the flow rate can therefore be controlled by monitoring the outflow temperature with an infrared receptor directed at the flow stream immediately below the bushing. This receptor (not shown) is connected to suitable electronic circuitry to vary the amount of coolant causing solidification within the bushing. Any heat losses arising from this control method are compensated for by the temperature control methods described above.

This method of mass flow control also has the benefit of allowing construction materials to be used with lower melting points than the temperature of the material it is controlling. This is possible because the molten material is flowing through a solidified layer of the same material and is not in direct contact with the bushing itself. The bushing may be at a temperature several hundred degrees lower due to the insulating effect of the solidified layer.

The above described methods used either individually or in combination allow fine control of flow streams being fed into the spinning devices such that fibres and flake may be produced with thicknesses below 250 nanometers and with thickness variations as low as 10 percent.

Reference has been made above to the use of apparatus of the present invention for producing glass flakes and fibres. However it should be appreciated that the apparatus may be used for producing flakes or fibres of any other appropriate material including ceramic materials.

The invention claimed is:

1. Apparatus for forming fibres or flakes of material comprising means (1) for producing a heated stream of molten material (9), means (3) for feeding the stream in a substantially vertical downward direction, means (7) for receiving the downwardly directed stream and for forming fibres or flakes therefrom, and a coil for effecting a change in the temperature of the stream subsequent to the production thereof whereby fibres or flakes of a desired thickness are obtained, wherein said coil heats the stream by application thereto of microwave radiation while the stream is traveling through the coil in the downward direction, and wherein the apparatus is additionally provided with means for cooling the stream prior to it being fed in the downward direction.

2. Apparatus according to claim 1, wherein the cooling means includes a conduit (3) through with the stream is fed, said conduit being surrounded by a cooling coil or jacket (23) through which an appropriate fluid may be fed.

3. Apparatus according to claim 1, wherein the apparatus is additionally provided with mass or volume flow control means.

4. A method for forming fibres or flakes of material comprising producing a heated stream of molten material, cooling the stream with a cooling device, feeding the cooled stream in a substantially vertical downward direction, receiving the downwardly directed stream and forming fibres or flakes therefrom, and effecting a change in the temperature of the stream subsequent to the production thereof whereby fibres or flakes of a desired thickness are obtained, wherein the change in the temperature of the stream is affected by heating the stream with temperature changing means for applying microwave radiation to the stream while the stream is traveling in the downward direction, and wherein the stream does not contact the temperature changing means.

5. A method according to claim 4, wherein, in addition to effecting a change in the temperature of the stream, a change is effected in the mass or volume flow of the stream.

6. Apparatus for forming fibres or flakes of material comprising means (1) for producing a heated stream of molten material (9), means (3) for feeding the stream in a substantially vertical downward direction, means (7) for receiving the downwardly directed stream and for forming fibres or flakes therefrom, and means (11, 13, 15, 17) for effecting a change in the temperature of the stream subsequent to the production thereof whereby fibres or flakes of a desired thickness are obtained, wherein said temperature changing means are means for heating the stream by application thereto of microwave radiation while the stream is traveling in the downward direction, wherein the temperature changing means is spaced apart from the stream as the stream travels through the temperature changing means, and wherein the apparatus is additionally provided with means for cooling the stream prior to it being fed in the downward direction.

7. Apparatus according to claim 6, wherein the cooling means includes a conduit (3) through with the stream is fed, said conduit being surrounded by a cooling coil or jacket (23) through which an appropriate fluid may be fed.

* * * * *